United States Patent
Dunn et al.

(10) Patent No.: US 6,701,303 B1
(45) Date of Patent: Mar. 2, 2004

(54) E-COMMERCE SYSTEM AND METHOD OF OPERATION ENABLING A USER TO CONDUCT TRANSACTIONS WITH MULTIPLE RETAILERS WITHOUT CERTIFICATION AND/OR TRUSTED ELECTRONIC PATHS

(75) Inventors: James M. Dunn, Fresno, CA (US); Edith H. Stern, Ft. Lauderdale, FL (US); Barry E. Willner, Briarcliff Manor, NY (US)

(73) Assignee: International Business Machines, Corp., Armonk, NY (US)

( * ) Notice: Subject to any disclaimer, the term of this patent is extended or adjusted under 35 U.S.C. 154(b) by 0 days.

(21) Appl. No.: 09/471,361

(22) Filed: Dec. 23, 1999

(51) Int. Cl.[7] ................................................. G06F 17/60
(52) U.S. Cl. .............................. 705/75; 705/1; 705/26; 705/39; 705/50; 705/64; 705/67
(58) Field of Search ................................. 705/1, 50, 51, 705/52, 53, 64, 67, 80, 26, 39, 75

(56) References Cited

U.S. PATENT DOCUMENTS

| | | | |
|---|---|---|---|
| 5,534,857 A | * 7/1996 | Laing et al. | 340/5.74 |
| 5,677,955 A | * 10/1997 | Doggett et al. | 380/24 |
| 5,710,889 A | * 1/1998 | Clark et al. | 235/379 |
| 5,715,314 A | * 2/1998 | Payne et al. | 705/78 |
| 5,737,619 A | 4/1998 | Judson | |
| 5,889,862 A | * 3/1999 | Ohta et al. | 380/24 |
| 5,974,146 A | * 10/1999 | Randle et al. | 380/24 |
| 6,230,148 B1 | * 5/2001 | Pare, Jr. et al. | 705/40 |

FOREIGN PATENT DOCUMENTS

JP        07319982 A  * 12/1995  ........... G06F/19/00

OTHER PUBLICATIONS

Smart Card Quarterly: EFT Report, Mar. 11, 1998, v21, n5.*
http://www1.fatbrain.com/asp/bookinfo—Digital Certificates: Applied Internet Security by Feghhi et al.
http://www.starnine.com/webstar/authorities.html—Starnine "SSL Certifying Authorities".

* cited by examiner

Primary Examiner—James P. Trammell
Assistant Examiner—Calvin L Hewitt
(74) Attorney, Agent, or Firm—Joseph C. Redmond, Jr.; Morgan & Finnegan, LLP

(57) ABSTRACT

An E-commerce system enables a user to conduct transactions with a retailer via a network, typically the Internet without certification or trusted paths. The user is a customer of a financial institution coupled to the network. The institution serves as an intermediary in electronic transactions conducted between end user and retailer. End user and retailer initiate transactions in an Internet session. User selects as one payment option a "check" or data messages as an intent to pay for the purchases without authentication of one another. Retailer prepares and submits a request for payment directly to the financial institution. After the retailer and financial institution exchange digital certificates, the financial institution records the transactions in the user's account as authorized for payment. The user is provided a list of authorized transactions for approval or rejection. Upon approval by the user, payment is made to the retailer by the institution.

32 Claims, 10 Drawing Sheets

E-COMMERCE SYSTEM AND METHOD OF OPERATION ENABLING A USER TO CONDUCT TRANSACTIONS WITH MULTIPLE RETAILERS WITHOUT CERTIFICATION AND/OR TRUSTED ELECTRONIC PATHS

BACKGROUND OF INVENTION (1) Field of Invention

This invention relates to E-commerce systems and method of operation. More particularly, the invention relates to an E-commerce system and method of operation enabling a user to conduct transactions with multiple retailers without certification and/or trusted electronic paths.

(2) Background Discussion

In today's environment, Internet Purchasing is one of the activities under the umbrella term of "E-commerce." The purchase follows the model of a catalog sale where the end user connects to a supplier, views a catalog, identifies an item and offers a payment method to complete the purchase. Payment methods include open accounts and credit card payments. The latter requires a credit card number and personal information furnished to the retailer. To secure this information, the transaction is typically encrypted using well known Internet standards such as Secure Socket Layer (SSL) and/or Secure Hypertext Transfer Protocol (SHTTP). These methods secure the data link between the end user and retailer. Another part of security involves authentication to ensure the transaction parties are the parties they are supposed to be. To accomplish authentication, users and retailers register with a third party authority which issues digital certificates. The certificates are guaranteed by the third party to identify the party they are supposed to be. Thus, in a catalog sale a retailer presents a certificate that authenticates the retailer and the user presents a certificate that authenticates the user, and the sale can proceed to the satisfaction of the parties. However, since each of the transaction parties must process the digital certificates as well as run an encryption application for the data link, a significant amount of processor resources are dedicated to handling the transaction. Moreover, a significant percentage of a bandwidth link is dedicated to encryption overhead rather than payload data. The problem is compounded for an E-commerce server which is required to conduct many concurrent sessions and data stream with end users. What is needed in the art is an E-commerce system and method of operation for minimizing (a) user software requirement and bandwidth utilization for E-commerce activities; (b) digital certification; (c) trusted electronic paths, and (d) any similar activities where the end user has multiple exchanges with host systems where the parties may or may not be the party claimed to be.

SUMMARY OF THE INVENTION

An object of the invention is an improved Ecommerce system and method of operation which minimizes digital certificates and trusted electronic paths in conducting electronic transactions.

Another object is an improved E-commerce system and method of operation which minimizes bandwidth requirements from a security standpoint in conducting electronic transactions.

Another object is an improved E-commerce system and method of operation which minimizes trusted electronic paths in conducting electronic transactions.

Another object is an electronic and improved E-commerce system and method of operation which eliminates digital certificates for users conducting electronic transactions.

These and other objects, features and advantages are achieved in an E-commerce system and method of operation which enables an end user to conduct electronic transactions with a retailer without certification and/or trusted paths. A distributed information network connects the end user to multiple retailers and to a unified banking source. The user establishes an account with bank for receiving and recording electronic transactions entered into by the user with retailers. In one embodiment, both the bank and the retailer obtain digital certificates from a third party who guarantees that the bank or retailer parties claimed to be in their respective certificates. The user does not obtain a digital certificate for conducting transactions with the retailer or the bank. In operation, the end user accesses the retailer site on the network for the purchase of goods or services after establishing a session. At the end of the session, the user indicates a payment preference, preferably by "check". The "check" includes the end user's name, account number and bank that will eventually cash the "check". The "check" is a data message and not a regular banking check. The retailer exchanges digital certificates with the bank and posts a request for payment message supplying the "check" containing the end user name; account number and amount of the cost of goods or services. The bank accepts the message as a "pending transaction" but the user's account is not debited. Later on, the end user accesses the bank using a secure path and without a digital certificate. The end user is presented with a list of pending payment requests representing purchase authorizations originated by the user and provided to the retailer. The end user approves or disapproves each payment request based on the recognition of a specific transaction (item, retailer and amount, etc.). Accordingly, no purchase authorization occurs by anyone except the user and then based on specific knowledge. After user approval, the bank makes payment to the retailer based on the retailer's digital certificate. In another embodiment, the end user establishes a unified banking source and obtains a unified banker ID (UBID). Several options are available to the end user in dealing with a retailer, none of which require a digital certificate or trusted path except between the end user and the bank at the option of the bank. In one option, a user visits or sends a message to a retailer indicating an intent to purchase goods or services and providing UBID information. The retailer transmits the purchased information and UBID information to the retailer bank. The retailer bank sends a message to the unified banker representing a request to pay for the goods or service purchased by the user. The unified bank collects payment requests from multiple retailers and waits for the user to review the list of purchases for payments. After payment authorization by the user, the unified bank notifies the retailer's bank and includes a payment for the approved purchases. The payment to the retailer bank can be made electronically and the retailer can be informed of an approved purchase. Alternatively, the payment can be made to the retailer through conventional payments not employing any electronic transfer. In still another embodiment, transactions between the user and retailer can be with immediate authorization of payment) Again, the user sends a message to the retailer indicating an intent to purchase goods or services and carrying UBID information. The retailer sends a message to bank with the purchase information and UBID information. The unified bank prompts the user with an immediate requests for authorization. The user sends a message to the unified bank through a secure path which is established at the start of a shopping session between the user and the unified bank either by explicit user command or triggered by a software program involved in a communication. The user unified bank communication can also be established via a trigger associated with the message from the unified bank. After receiving payment authorization, the unified bank initiates a message to the retailer bank or to the retailer with payment.

DESCRIPTION OF THE DRAWING

The invention will be further understood from the following detailed description of a preferred embodiment taken in conjunction with an appended drawing, in which:

FIG. 2B-1-FIG. 2B-4 are flow diagrams for initiating an online transaction with a retail site using the systems of FIG. 1;

FIG. 3 is a further representation of FIG. 1 including a unified banking source participating in electronic transactions conducted in FIG. 1 without the need for a third party certificate authority and/or trusted electronic paths.

DESCRIPTION OF PREFERRED EMBODIMENT

Figure 1:
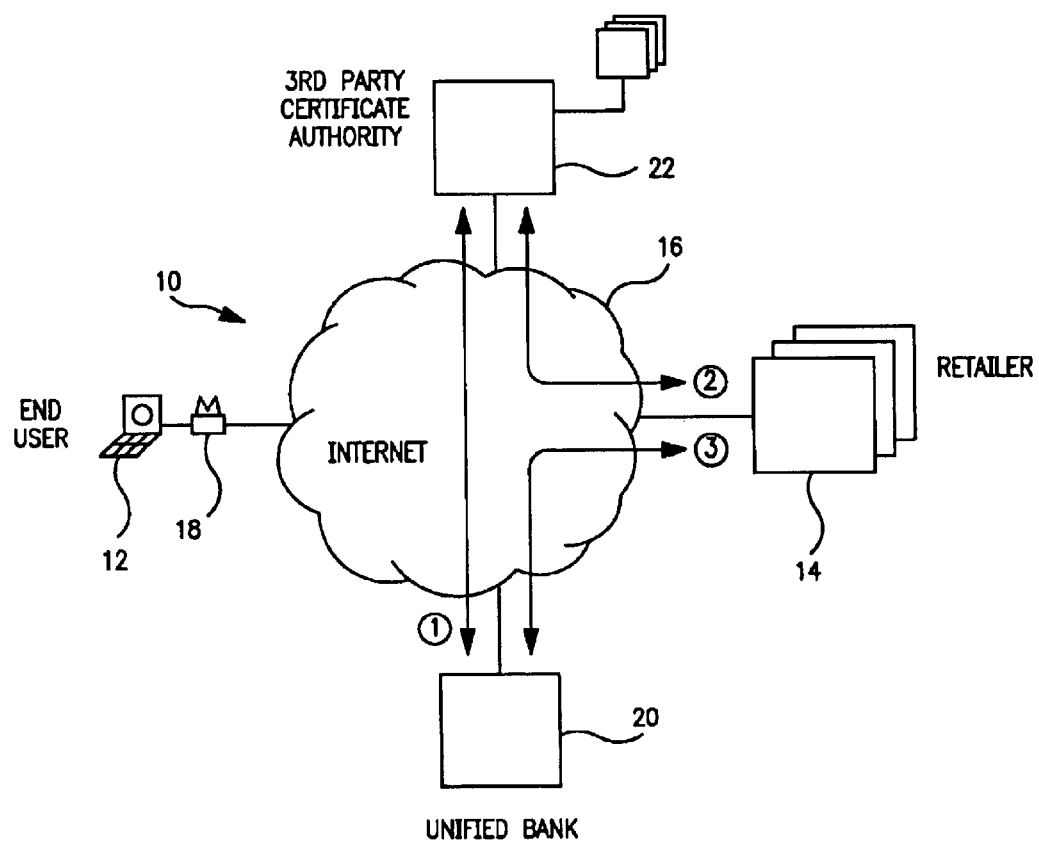
FIG. 1 is a representation of an E-commerce system involving an end user linked to a bank and interacting with a plurality of retailers, both the bank and retailers having digital certificates issued by a third party certificate authority and incorporating the principles of the present invention.

In FIG. 1, an E-commerce system 10 enables an end user 12 to conduct electronic shopping with a retailer (s) 14 through the Internet 16 using a modem 18 without the need to exchange digital certificates between the end user and the retailer. Prior to conducting electronic transactions, the end user opens an account with a unified bank 20 by visiting the bank or registering electronically with the bank. The account serves to receive electronic transactions from retailers and others.

In order to serve the account needs of end users, the bank 20 communicates over path 1 with a third party certificate authority 22. The path 1 may or may not be a trusted or secure path using Secure Socket Layer (SSL) or Secure Hyper Text Transport Protocol (SHTTP) to obtain a digital certificate for use in conducting electronic transaction with others. The certificate authority 22 issues a unique digital certificate solely definitive of the bank 20 or other registrants. Digital certificates are described in the text "Digital Certificates: Applied Internet Security" by Feghhi et al, published by Addison Wesley, November 1998, ISBN 02011309807. A number of third party certificate authorities presently operate including Thawte USA Consulting, 343 Six Forks Road, and Suite 180, Raleigh, N.C. 27609; VeriSign, Inc., Mountainview, Calif. and others.

Likewise, the retailer(s) obtain a digital certificate(s) from the certificate authority 22 over path 2 to obtain a unique digital certificate solely definitive of the retailer 14 or other registrants. Again, the path 2 may or may not be a secure path. The digital certificate issued to the retailer is unique to the retailer. Both the retailer and bank having digital certificates can exchange information or data with one another over path 3 as part of a transaction conducted between the end user and the retailer. In this way, the bank 20 knows the source of the certificate and the retailer 14 knows the source of the bank.

The end user, however, does not need to use a digital certificate in conducting electronic transactions with the retailer. When an end user wishes to make a purchase from a retailer it initiates an Internet session with the appropriate retailer and proceeds as normal to view catalogs and select items for purchase. At the end of the shopping session, the end user indicates a preference, either "check" or credit card just as occurs today in any catalog order. At this point, the electronic paths can optionally become encrypted but not a signed session to exchange the credit card number or the "check" data. The "check" data is the end user's name, bank number and bank that will eventually cash the "check." The "check" is just a data message sent to the retailer not a regular check presently used by banks. The retailer now has a choice of shipping the merchandise or waiting for the "check" to clear just as occurs in today's electronic transactions.

Check clearing in the present invention, however, is different from normal check clearing practices, which usually occurs in three to four days. In the E-commerce system 10 "check" clearing does not happen in real time while the end user is interacting with a retailer. The "check clearing" may not happen for several days or week. The merchandise may or may not be shipped until the "check" clearing is complete, but that is the option of the retailer and can be accomplished using current risk analysis tools as is done today when regular bank checks are accepted at a store without an online check approval.

At some point, the retailer will exchange digital certificates with the bank and post a message to the bank supplying the "check" data, i.e., user name, account number and transaction amount. The bank 20 accepts the message as a "pending transaction" but not clearing the "check" at this time. The "check" cannot be authenticated by the bank, since no certificate was used between the end user and the retailer. However, the retailer can be authenticated by the bank since the bank and retailer exchange certificates. But at this point, the "check" is still pending.

Subsequently, the end user accesses his/her account at the bank, as is presently the case in any online banking operation. The end user to bank line is usually secured using SSL or SHTTP but without signed certificates. Thus, the end user has the same level of security for electronic transactions as is currently available for any online account manipulation. By accessing the account, the end user is presented with a list of "pending payment request" that represents "checks" for purchases completed by the end user. The end user will authorize or reject each "check" in his account based on recognition of a specific transaction (item, retailer, amount, etc.). In this way, there will not be any "checks" authorized by anyone or means except the account holder or end user and then based on his/her specific knowledge. Having authorized payment for a "check" the bank proceeds to make payment to the retailer based on the retailer's certificate and the authentication of the end user in using the online banking system or the end user visiting the bank when payment was authorized.

In the E-commerce system 10, the end user does not suffer the overhead of using digital certificates either for the retail session or the bank session. Nor does the end user deal with secure lines in conducting a shopping session. The retailer is relieved of the workload processing of end user digital certificates for each sale or transaction conducted and secure lines in conducting transaction. The bank is relieved of the problem of authorizing payments for items never ordered or ordered and cancelled. Moreover, the software requirements, processing resources and bandwidth utilization for E-commerce activities are reduced for the user, retailer, band certificate authority. The reduction in processing resources and bandwidth requirements is particularly important to banks, retailers and certificate authorities which handle multiple transactions from multiple users.

Figure 2:
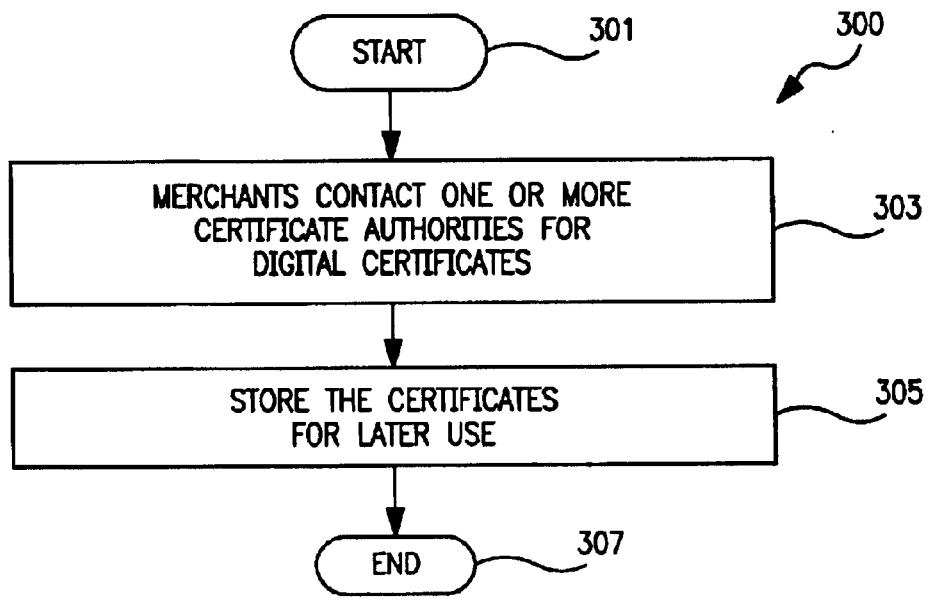
FIG. 2 and FIG. 2A are flow diagrams for obtaining digital certificates used in electronic transactions in the system of FIG. 1.

The operation oft he E-commerce system 10 will be more particularly described in a process 300 shown in FIG. 2A–2C, as follows:

In FIG. 2, the process 300 is entered or started in block 301 in which the retailer contacts one or more certificate authorities for digital certificates in block 303. The retailer digital certificates are stored for later use in block 305 and the retail initial setup process ends in block 307.

Figure 2A:
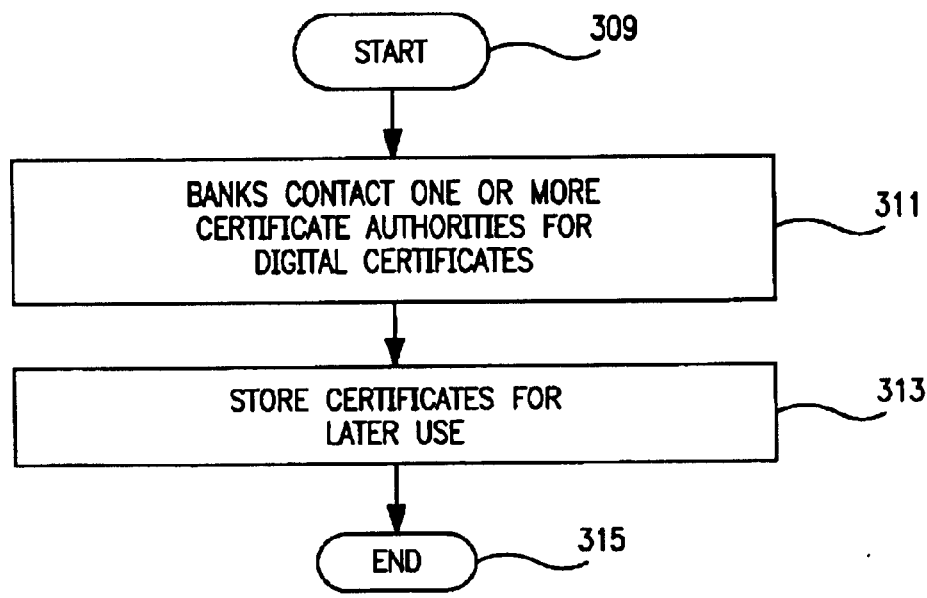

In FIG. 2A, the initial setup for the unified bank is entered or started in block 309. The bank contacts one or more certificate authorities for digital certificates and 311 and stores them for later use in block 313 afterwards the bank initial setup ends in block 315.

Figures 1, 2B:
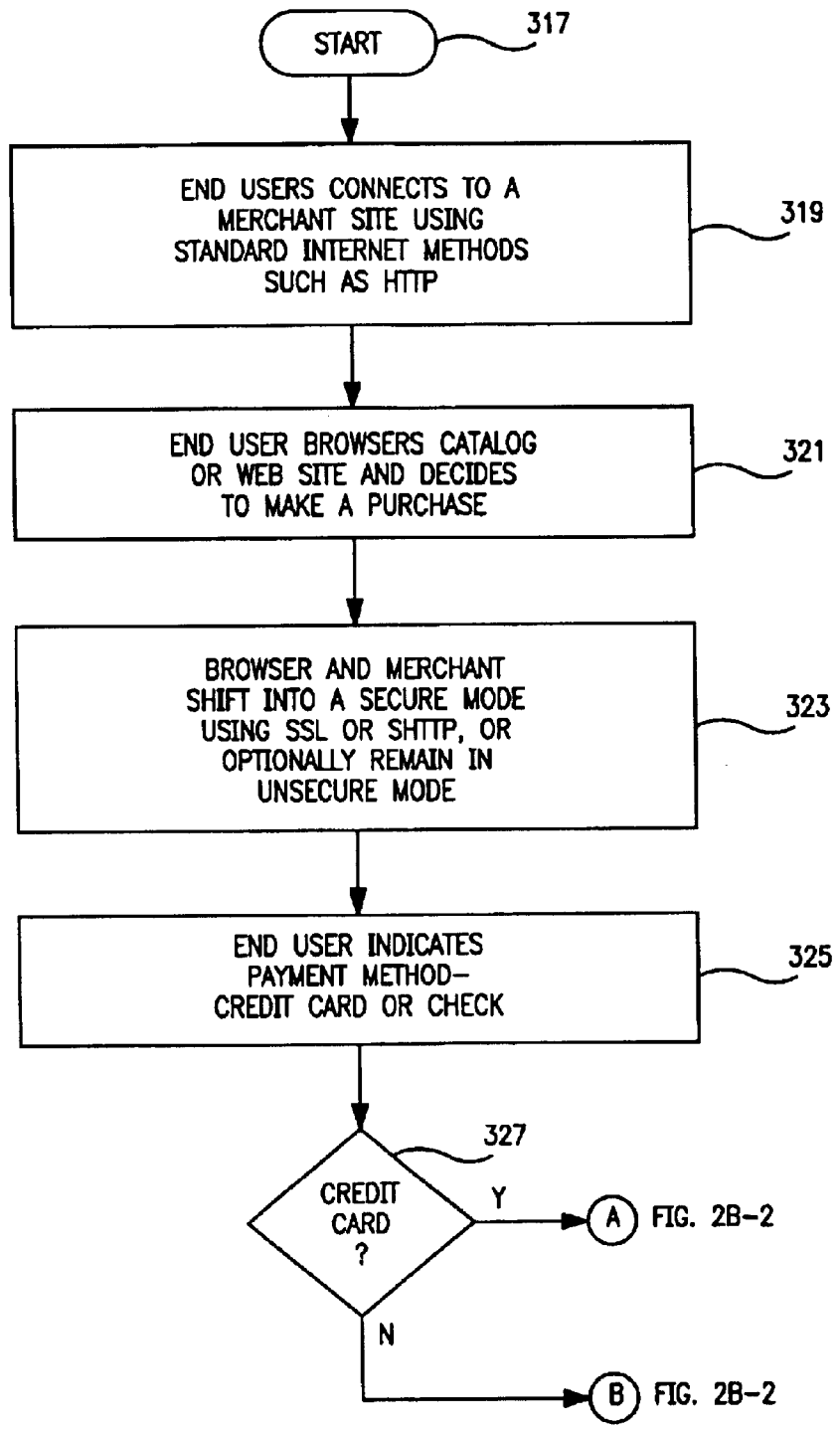
Figures 2, 2B:
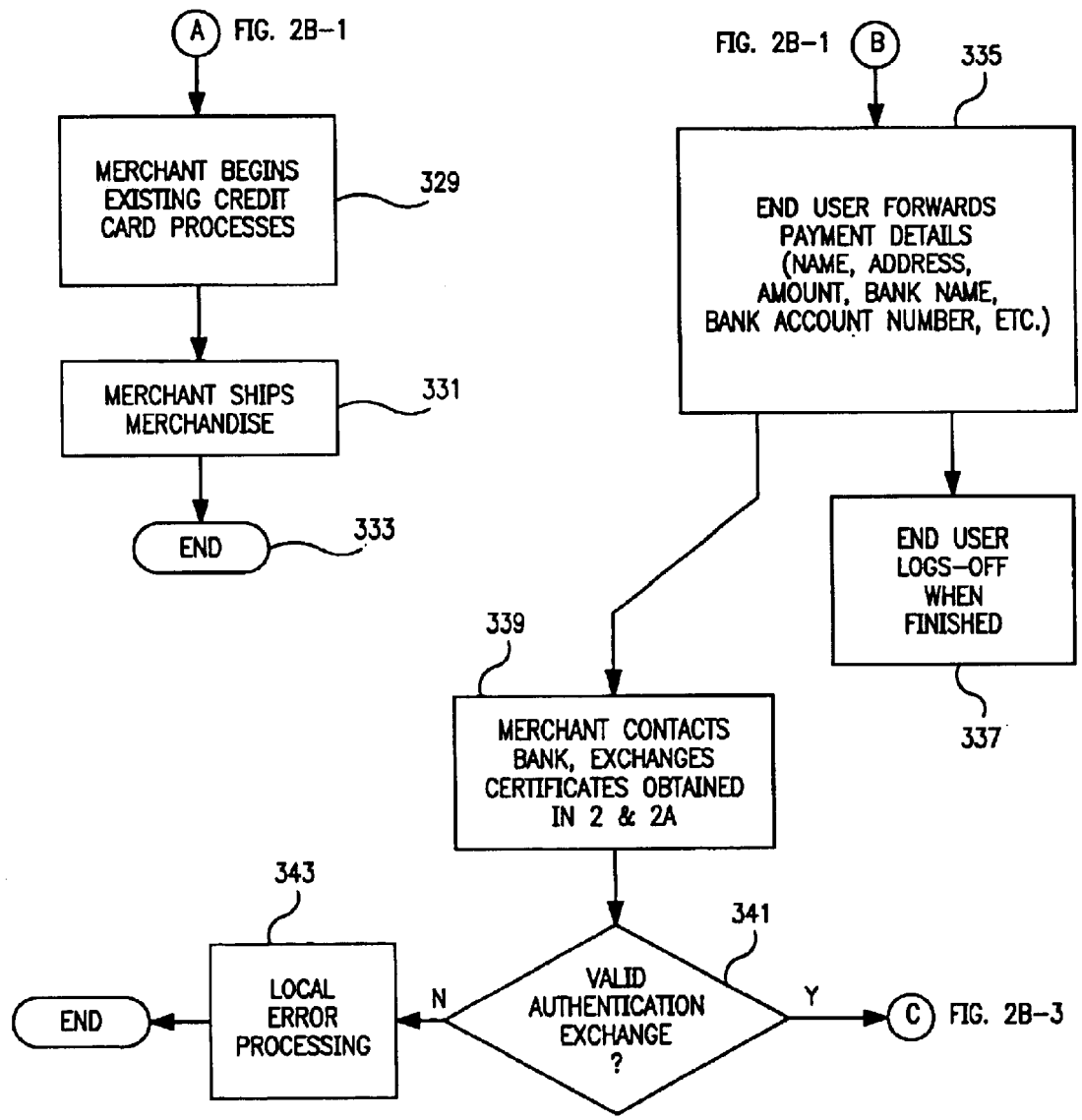

In FIG. 2B-1 an end user starts or initiates an online transaction in block 317 by connecting to a retail site using standard Internet methods such as HTTP in block 319. The end user browses the catalog or web site and selects items for purchase in block 321. In block 322, the end user browser and retailer shift into a secure communication mode using SSL or SHTTP or optionally the end user browser and retailer may remain in an unsecured communication mode. In block 325, the end user in response to the retailer's E-commerce application indicates a payment method typically, a credit card number or a "check." The retailer conducts a credit card test in block 327. A "yes" condition initiates a standard credit card process implemented by the retailer in block 329, as shown in FIG. 2B-2. If the credit card company authorizes payment, the retailer ships the merchandise to the end user in block 331 and the online transaction process ends in 333.

Figures 2, 2B, 3:
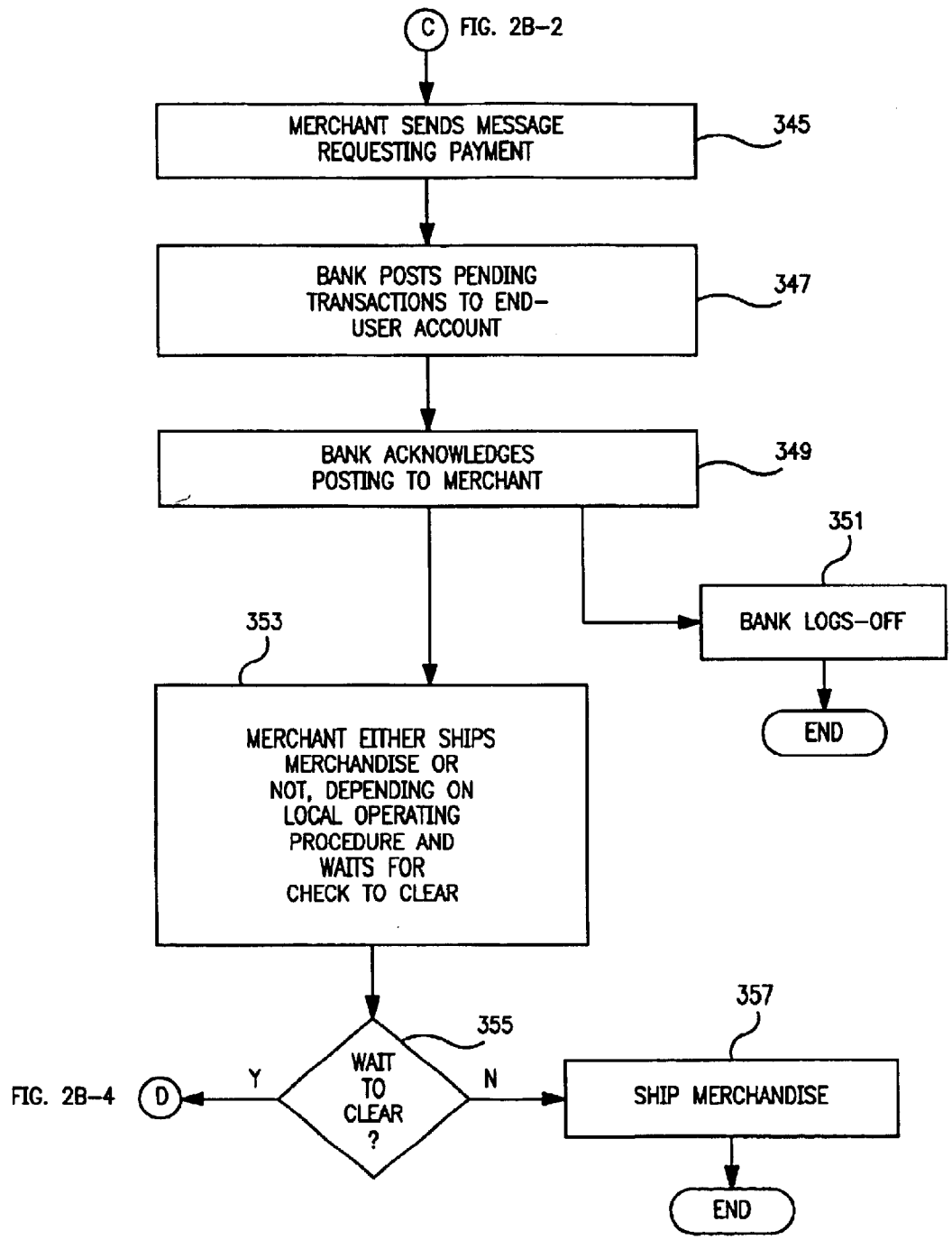

Returning to the test in 327, a "no" condition initiates block 335, as shown in FIG. 2B-2 in which the end user provides a retailer with "check" details, i.e., name, address, amount, bank name, bank account number and any other details required by the retailer. After providing "check" details, the end user logs off in block 337. The retailer proceeds in block 339 to contact the end user's bank and exchanges digital certificates with the bank previously obtained in blocks 303 and 313. The bank and the retailer authenticate each other's digital certificates in test blocks 341. A "no" condition initiates a local error processing by either bank or the retailer and the process ends in block 343 without the retailer shipping the merchandise to the end user or the bank accepting the transaction based on unrecognized digital certificate. A "yes" condition for the test block 341 initiates block 345 in which the retailer sends a message requesting payment of the "check" in block 345, as shown in FIG. 2B-3. The bank posts a pending transaction to the end user account in block 347. The bank acknowledges posting to the retailer in block 349 after which the bank logs off in block 351 and the bank returns to the test block 341 to await further retailer contact.

In block 353, the retailer ships the merchandise or delays shipping the merchandise depending on the retailer's operating procedure and waits for a "check" to be cleared by the bank. In block 355, the retailer waits to clear the "check". If the retailer decides not to wait for the "check" to clear, the merchandise is shipped in block 357 and the retailer waits for the next online transaction to be initiated by the end user. A "yes" condition for the test block 355 in which the retailer waits for the "check" to clear, the merchandise is held until "check" clearance in block 359, as shown in FIG. 2B-4. The retailer waits for "check" clearance in test block 361 and continues to hold the merchandise if the "check" is not cleared and ships the merchandise to the end user in block 363 when the "check" clears, after which the retailer waits for the next electronic transaction to be conducted by the end user.

Figures 2, 2B, 3, 4:
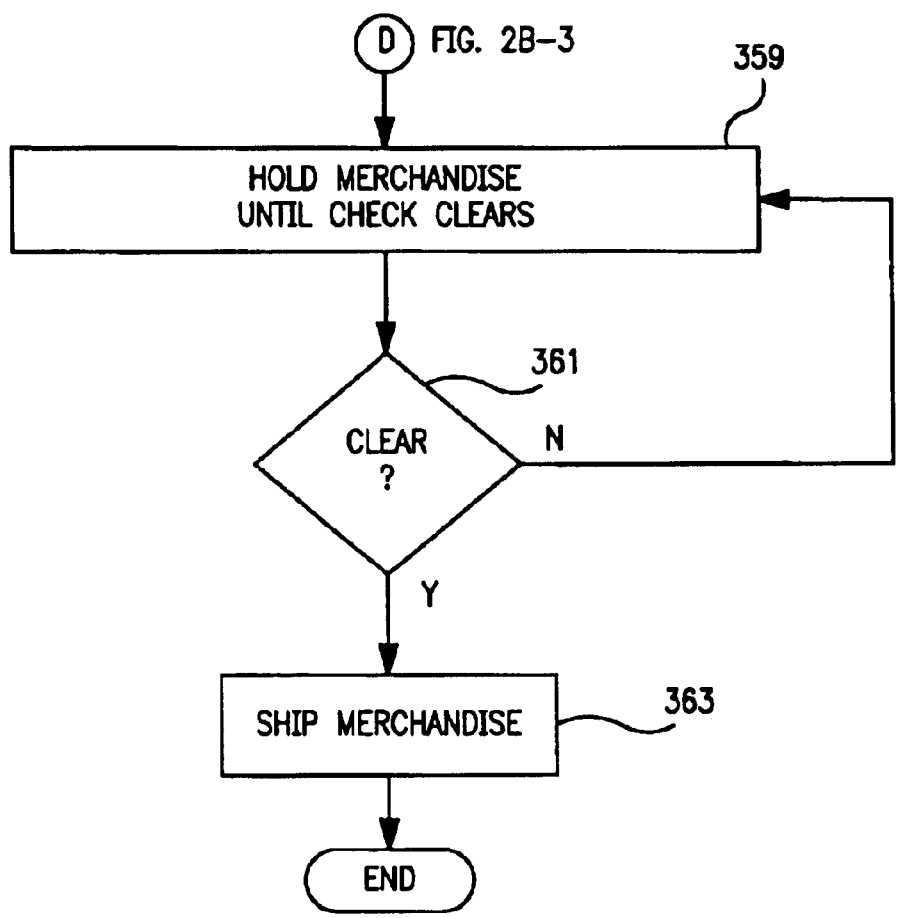
Figure 2C:
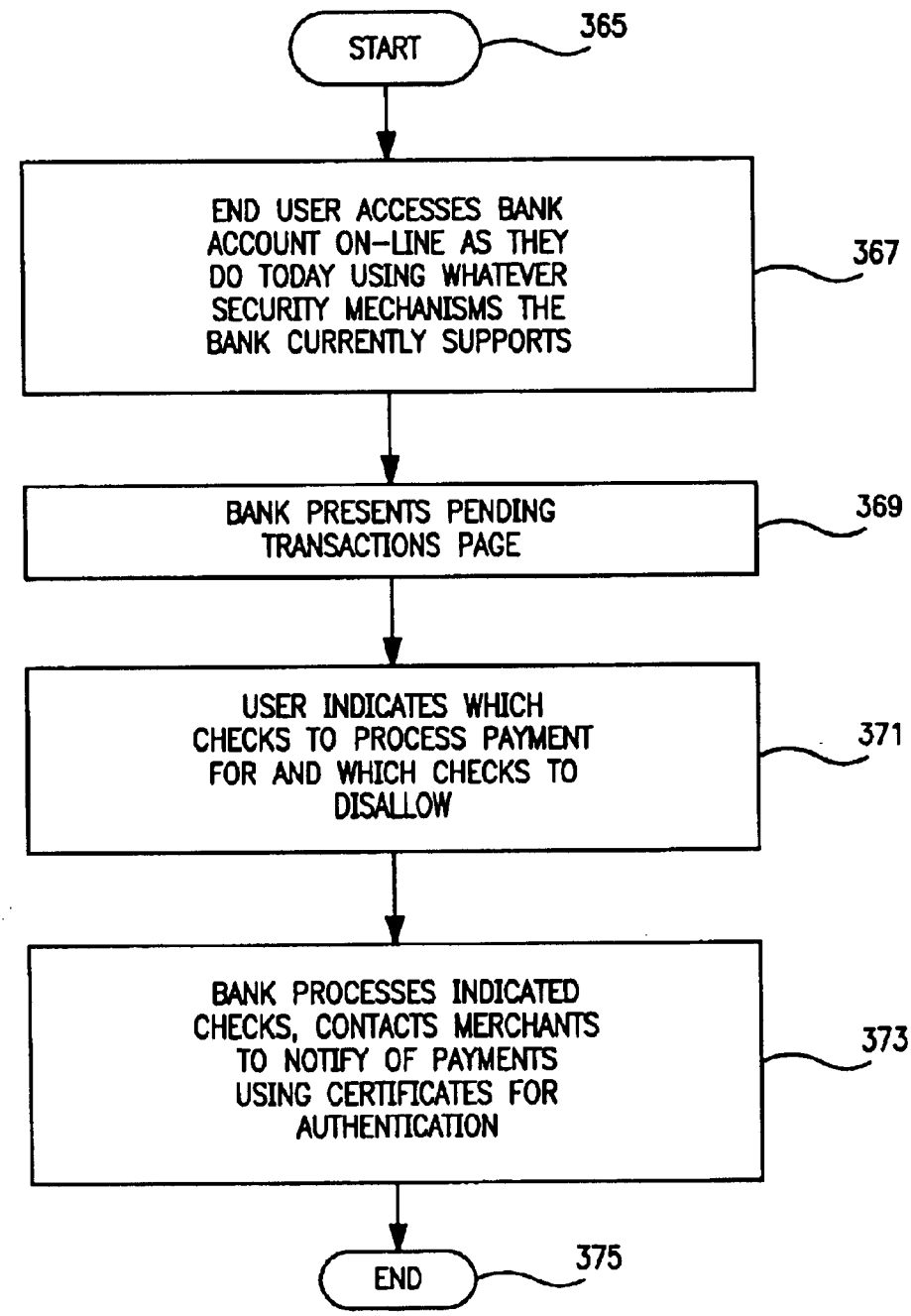
FIG. 2C is a flow diagram initiating a payment authorization in the system of FIG. 1.
Figure 3:
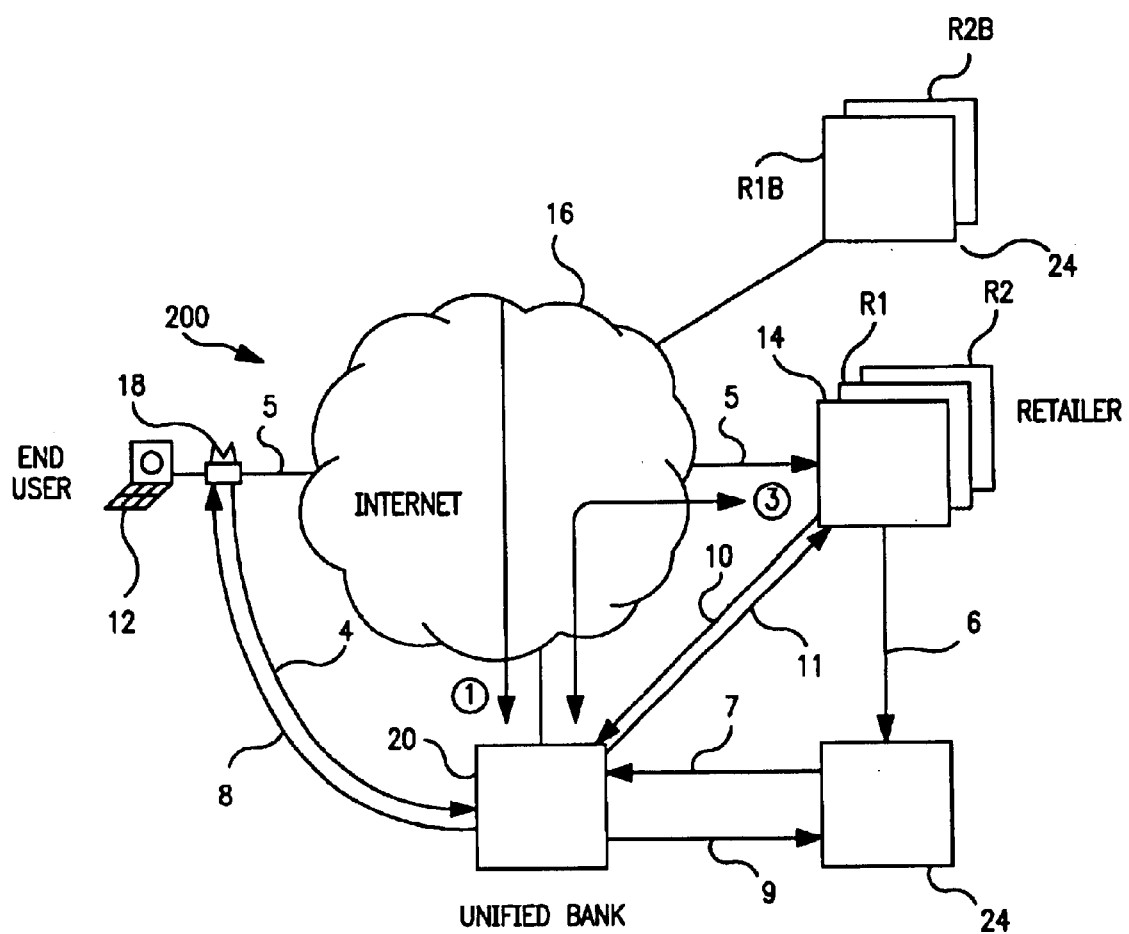

In FIG. 2C, an end user initiates payment authorization in block 365 by accessing the end user bank account in block 367 and using whatever communication security mechanism the bank currently supports. After accessing the account, the bank presents the pending transaction page listing the "checks" in block 369. The user indicates which "checks" to process for payment and which "checks" to be rejected in block 371. The bank processes the authorized "checks" and contacts the retailer to notify payment using the banks digital certificate for authentication of the purchase in block 373. The bank posts the "check" to the retailers account if one exists or forwards the payment to the retailer's bank or to the retailer as the case may be and the process ends in block 375.

Turning to FIG. 3, an alternative E-commerce system 200 for electronic transactions between end users and retailers eliminates the need for certificate authorities and digital certificates. The system components in FIG. 3 have the same reference characters in FIG. 1 where the components correspond. The system may or may not include a retailer bank 24 as part of conducing transactions in the system In FIG. 3, the user establishes an electronic checking account with the bank 20 by physically visiting the bank or sending a message 4, typically over a secure path, and obtains a unified banker ID (UBID). A unified banker ID contains all the information necessary to electronically identify bank 20 during electronic transactions with retailers. The UBID may contain the network address. (e.g. IP address), or e-mail address of the bank, and other identifiers, e.g. FDIC certificate number. The UBID also contains a user account identifier similar in intent to that printed on paper checks. The end user uses the UBID as an account designation in conducting electronic transactions with the retailers in several embodiments, as follows:

In one embodiment, the user 12 sends a message 5 to the retailer 14 indicating an intent to purchase an item(s) and carrying UBID information. The retailer sends a message 6 to the retailers bank 24 with the end user information including the UBID and the amount to be obtained from the unified bank 20. Alternatively, the purchase amount and UBID information can be embedded in the message 5 and merely passed along by the retailer to the retailer bank with message 6. At this point, the end user has not issued a committed authorization for the expenditure. The retailer has the choice of either transferring the purchase immediately or holding the purchase until the request for payment has been cleared. The retailer chooses how much risk to take based on the value of the purchase, the relationship with the end user. The UBID transaction does not require digital certificates or any particular communication security. If the UBID is compromised and a false request for payment is issued, the end user will not authorize payment. The retail bank sends a message 7 to the unified bank 20 presenting the request pay information with the addition of information identifying the retailer. The bank 20 sends the message 8 either through computer networks or via PIN or phone advising the end user that a request for payment has been received and instruction with processing the request. When the end user next visits the bank site, the end user account's shows checking account entries as well as "request for payments." The end user may authorize these one at a time. Alternatively when authorizing "request for payments" offsite secure communications are required as in any electronic banking system. The end user may contact the bank 20 in other ways. The end user may use a security connected kiosk device or may telephone the bank and speak to a representative or engage in a VRU interchange to authorize or reject payment. If the end user identifies a request for payment as incorrect or does not wish to authorize payment for some other reason, the end user instructs the unified bank which in turn notifies the retailer of the non-payment through the retailer's bank.

The unified bank service can be provided by an existing bank, or the service can be provided by a server based prepaid services. The process requires that after "n" purchases where "n" is a specific integer; the user must visit the back site to authorize payments. Upon authorization of payment, the bank sends a message 9 to the retail bank with payment information. The payment can be made electronically and an additional message (not shown) can be sent to the retailer.

In another embodiment, the end user sends a message 5 to the retailer indicating an intent to purchase an item and carrying UBID information. The retailer sends the message 10 directly to the UBID requesting payment. At some point, the end user authorizes payment and the UBID pays the retailer either through a message 11 or via conventional means.

In still another embodiment, the end users accesses other retailers R1 and R2 as previously described. The retailers or their banks R1B and R2B send messages requesting payment to the UBID. The end user examines the bank account and elects to either authorize payment, decline payment or just ignore the transaction for now. If the end user declines to pay, for example, if the end user does not recognize the charge, then a message is sent to the requesting bank indicating refusal.

Figure 4A:
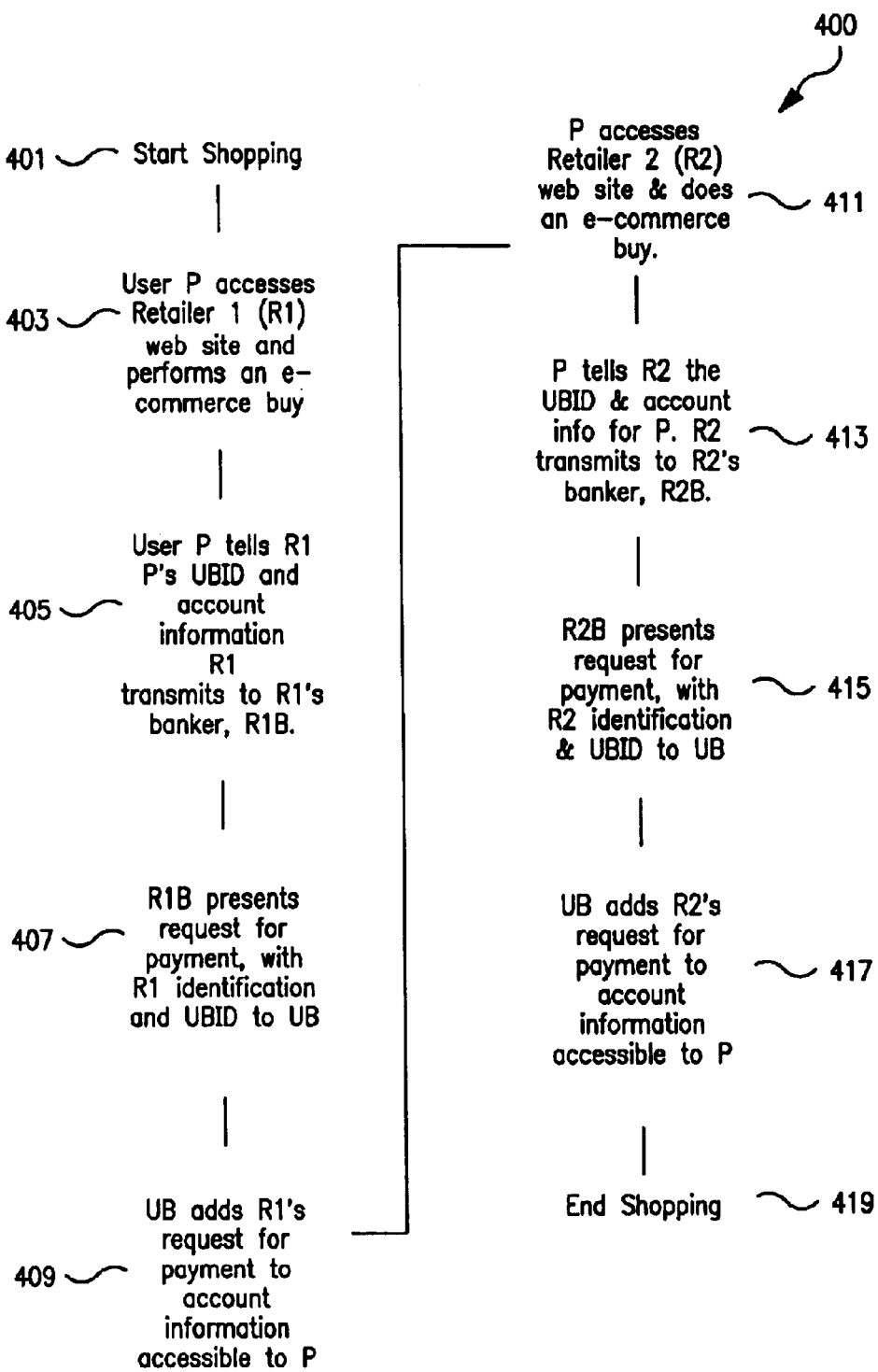
FIGS. 4A and 4B are flow diagrams for conducting electronic transactions in the system of FIG. 3.

The alternative end user system to 200 will be further described in a process 400 shown in FIGS. 4A and B taken in conjunction with FIG. 3. In FIG. 4 4A, pre-authorization for shopping is entered in block 401. An end user P accesses the retailer R1 web site and performs an E-commerce transaction in block 403. The end user provides the retailer UBID account information and the retailer transmits the information to the R1B in block 405. The R1B presents a request for payment to UBID to the bank and identifies the end user's account information to the unified banker in block 407. The unified bank adds R1's request for payment to the end user's account information in block 409. Another user P transaction may access Retailer R2 web site and conduct an E-commerce purchase in block 411. Again, the end user provides the Retailer R2 the UBID and account information and the Retailer R2 transmits the information to the retailer's bank R2B in block 413. R2B presents the "request for payment" and end user account information to the unified bank 20 in block 415. The unified bank adds the R2 "request for payment" and account information to the end user's account for authorization or rejection as they case may be for both the R1 and R2 E-commerce purchases in block 417.

Figure 4B:
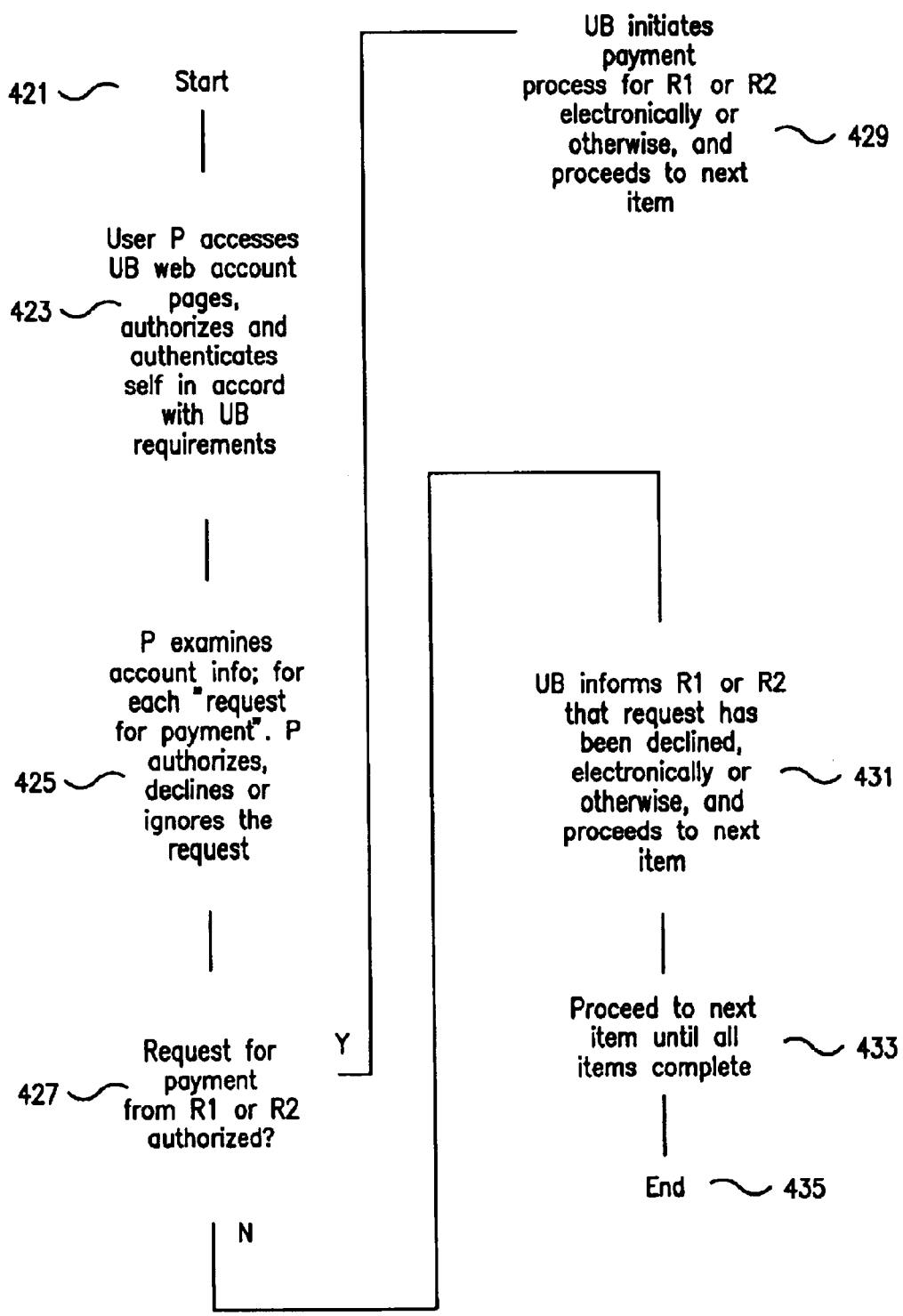

At this point, the end user shopping may have ended in block 419 and a process for authorizing payment is started in block 421, as shown in FIG. 4B. In block 423, the end user accesses the unified bank web account pages in block 423 and is authenticated using the unified bank security requirements. After authentication, the end user examines the account information in block 425 and authorizes or declines the each request for payment. In block 427, an authorized payment request initiates block 429 in which the unified bank initiates electronic payment to a retail bank R1 or R2 as they case may be using the electronic funds transfer system or like for each item authorized by the end user. After electronic payment of each authorized request for payment, the electronic bank waits for the next user access to the account.

If a request for payment is not authorized in block 427, the bank informs the retailer R1 or R2 as the case may be in block 431 that the request has been declined electronically or otherwise and proceeds to the next item. Each request for payment is processed in block 433 until the bank processes all items which the user has accepted or rejected, and the process ends in block 435 in which the bank waits for the user's next access to the end user's account.

While the invention has been shown in a preferred embodiment, various changes can be made without departing from the spirit and scope of the invention as defined in the appended claims, in which:

We claim:

1. An E-commerce system for conducting electronic transactions comprising:

at least one end user coupled to open distributed information network or Internet for conducting electronic transactions;

at least one retailer coupled to the Internet for conducting electronic transactions with multiple users through a server on the Internet;

a financial institution coupled to the network and serving as an independent intermediary in electronic transactions conducted between the end user and the retailer;

means for conducting end user authorized electronic transactions for purchases made by the end user from the retailer via an Internet session and selecting as one option a "check" or data messages as an intent to pay for the purchases by the user the end user or the retailer authenticating one another;

means for preparing a request for payment by the retailer for the purchases made by the end user and submitting the request directly to the financial institution; and means providing the end user a list of the end user authorized transactions for approval or rejection whereby approval of the authorized transaction authorizes payment to the retailer and rejection erases the transaction from the list.

2. The Ecommerce system of claim 1 further comprising:

means for providing the user with a financial institution UBID as an account designation for conducting an electronic transaction with a retailer via a an Internet session.

3. The Ecommerce system of claim 2 further comprising:

means for providing the UBID and purchase information to the financial institution as a request for payment in behalf of the retailer for purchases selected for delivery to the end user.

4. The Ecommerce system of claim 1 further comprising:

means for storing the list for payments in the financial institution until approved by the end user.

5. The Ecommerce system of claim 4 farther comprising:
means for approving or rejecting the list for payment by the user at the financial institution.

6. The Ecommerce system of claim 4 further comprising:
a retailer financial institution serving the retailer as an intermediary between the financial institution and the retailer for end user authorized electronic transactions conducted between the end user and the retailer for purchases made by the end user from the retailer using data messages in an Internet session.

7. The Ecommerce system of claim 1 further comprising:
at least one certificate authority coupled to the distributed information system for providing digital certificates to the financial institution and the retailer.

8. The Ecommerce system of claim 7 further comprising:
means for exchanging digital certificates solely between the financial institution and the retailer prior to or as a part of conducting electronic transactions between the end user and the retailer for purchases made by the end user from the retailer using a digital message or check via an Internet session.

9. The Ecommerce system of claim 8 further comprising:
means for issuing data messages by the end user for the purchases made by the end user from the retailer via an Internet session.

10. The Ecommerce system of claim 9 further comprising:
means for presenting the data messages to the financial institution by the retailer as request for payments for the purchases made by the end user from the retailer via an Internet session.

11. The Ecommerce system of claim 10 further comprising:
means for storing the request of checks for payments in the financial institution for approval or rejection by the end user before payment is made to the retailer by the financial institution.

12. The Ecommerce system of claim 1 further comprising:
means providing immediate authorization of payment by the financial institution to the retailer for purchases made by the user from the retailer, after the financial institution and the retailer exchange digital certificates and approval by the end user.

13. The Ecommerce system of claim 1 wherein the network is the Internet.

14. The Ecommerce system of claim 1 wherein the server is a web server.

15. The Ecommerce system of claims 1 wherein the end user is coupled to the network through a browser.

16. In an Ecommerce system including at least one end user coupled to at least one retailer and a financial institution serving as an intermediary for the retailer and the end user through an open distributed information network or Internet, a method for conducting secure electronic transactions between the end user and the retailer without digital certificates and/or secure communication paths, comprising the steps of:
providing the user with a financial institution UBID conducting an electronic transaction with a retailer via a network session;
providing the UBID and end user authorized electronic transactions for purchases made by the end user to the financial institution as a request for payment in behalf of the retailer; and
providing the end user a list of the end user authorized electronic transactions for approval or rejection whereby approval of the authorized electronic transaction authorizes payment to the retailer and rejection erases the transaction from the list.

17. The method of claim 16 further comprising the step of:
establishing a retailer financial institution serving the retailer as an intermediary between the financial institution and the retailer for the end user authorized electronic transactions conducted between the end user and the retailer for purchases made by the end user from the retailer.

18. The method of claim 16 further comprising the step of:
establishing at least one certificate authority coupled to the distributed information system for providing digital certificates to the financial institution and the retailer.

19. The method of claim 18 further comprising the step of:
exchanging digital certificates solely between the financial institution and the retailer prior to or as a part of conducting electronic transactions between the end user and the retailer for purchases made by the end user from the retailer.

20. The method of claim 16 further comprising the step of:
issuing data messages by the end user for the purchases made by the end user from the retailer.

21. The method of claim 16 further comprising the step of:
presenting data messages to the financial institution as requests for payments by the retailer for the purchases made by the end user from the retailer.

22. The method of claim 21 further comprising the step of:
storing the request for payments in the financial institution for approval or rejection by the end user before payment is made to the retailer.

23. The method of claim 16 further comprising the step of:
providing immediate authorization of payment by the financial institution to the retailer for purchases made by the user from the retailer after the financial institution and the retailer exchange digital certificates and approval by the end user.

24. The method of claim 16 wherein the network is the Internet.

25. The method of claim 16 wherein the server is a web server.

26. The method of claim 16 wherein the end user is coupled to the network through a browser.

27. An article of manufacturing comprising:
a program medium, executable in a computer system, for conducting secure electronic transactions between an end user and a retailer without digital certificates and/or secure communication paths in an Ecommerce system including at least one end user coupled to at least one retailer and a financial institution through a server in an open distributed information network or Internet, comprising:
program instructions in the program medium for providing the user with a financial institution UBID for authenticating the user in conducting an electronic transaction with a retailer;
program instructions in the program medium for providing the UBID and end user authorized electronic transactions purchases made by the end user to the financial institution as a request for payment in behalf of the retailer; and
program instruction in the medium providing the end user a list of the end user authorized electronic transactions for approval or rejection whereby approval of the authorized electronic transaction authorizes payment to the retailer and rejection erases the transaction from the list.

28. The article of manufacture of claim 27 further comprising:
   program instructions in the program medium for establishing a retailer financial institution serving the retailer as an intermediary between the financial institution and the retailer for the end user authorized electronic transactions conducted between the end user and the retailer for purchases made by the end user from the retailer.

29. The article of manufacture of claim 27 further comprising:
   program instructions in the program medium for issuing data messages by the end user for the purchases made by the end user from the retailer.

30. The article of manufacture of claim 27 further comprising:
   program instructions in the program medium for presenting data messages to the financial institution as requests for payments by the retailer for the purchases made by the end user from the retailer.

31. The article of manufacture of method of claim 27 further comprising:
   program instruction in the program medium for storing the request for payments in the financial institution for approval or rejection by the end user before payment is made to the retailer.

32. The article of manufacture of claim 27 further comprising:
   program instructions in the program medium for providing authorization of payment by the financial institution to the retailer for purchases made by the user from the retailer.

* * * * *

UNITED STATES PATENT AND TRADEMARK OFFICE
CERTIFICATE OF CORRECTION

| | | |
|---|---|---|
| PATENT NO. | : 6,701,303 B1 | |
| APPLICATION NO. | : 09/471361 | |
| DATED | : March 2, 2004 | |
| INVENTOR(S) | : James M. Dunn, Edith H. Stern and Barry Willner | |

It is certified that error appears in the above-identified patent and that said Letters Patent is hereby corrected as shown below:

Rewrite Claim 1 as indicated below:

1. An E-commerce system for conducting electronic transactions comprising:

at least one end user coupled to open distributed information network or Internet for conducting electronic transactions;

at least one retailer coupled to the Internet for conducting electronic transactions with multiple users through a server on the Internet;

a financial institution coupled to the network and serving as an independent intermediary in electronic transactions conducted between the end user and the retailer;

means for conducting end user authorized electronic transactions for purchases made by the end user from the retailer via an Internet session and selecting as one option a "check" or data messages as an intent to pay for the purchases by the user <u>without</u> the end user or the retailer authenticating one another;

means for preparing a request for payment by the retailer for the purchases made by the end user and submitting the request directly to the financial institution; and

UNITED STATES PATENT AND TRADEMARK OFFICE
CERTIFICATE OF CORRECTION

PATENT NO.         : 6,701,303 B1
APPLICATION NO. : 09/471361
DATED              : March 2, 2004
INVENTOR(S)        : James M. Dunn, Edith H. Stern and Barry Willner It is certified that error appears in the above-identified patent and that said Letters Patent is hereby corrected as shown below:

Rewrite Claim 1 as indicated below (cont'd):

means providing the end user a list of the end user authorized transactions for approval or rejection whereby approval of the authorized transaction authorizes payment to the retailer and rejection erases the transaction from the list.

Signed and Sealed this

Twenty-first Day of August, 2007

JON W. DUDAS
*Director of the United States Patent and Trademark Office*